United States Patent [19]
Bardin et al.

[11] 3,980,564
[45] Sept. 14, 1976

[54] MEMBRANE SUPPORT-PLATES FOR FLUID SEPARATING APPARATUS AND APPARATUS USING SUCH SUPPORT-PLATES

[75] Inventors: Robert Bardin, Vienne; André Toulouze, Lyon, both of France

[73] Assignee: Rhone-Poulenc S.A., Paris, France

[22] Filed: May 29, 1974

[21] Appl. No.: 474,345

[30] Foreign Application Priority Data
May 29, 1973 France .............................. 73.19532

[52] U.S. Cl. ........................ 210/321 R; 210/433 M
[51] Int. Cl.² ......................................... B01D 31/00
[58] Field of Search .......... 210/321, 232, 486, 417, 210/343, 433, 346

[56] References Cited
UNITED STATES PATENTS
3,263,819   8/1966   Schmidt et al...................... 210/486
3,809,246   5/1974   Niogret........................... 210/433 X

*Primary Examiner*—Frank A. Spear, Jr.
*Attorney, Agent, or Firm*—Stevens, Davis, Miller & Mosher

[57] ABSTRACT

Membrane support-plates for fluid separating apparatus, and apparatus using such support-plates, wherein the support-plates are generally rectangular, being formed of two stamped metal plate elements arranged back-to-back, each element having a cell in its face over which extends a membrane, an elongate orifice adjacent one or both ends thereof for the introduction of fluid to be treated, a transverse cavity extending adjacent each transverse edge of a cell and a detachable bar and/or gasket located in each cavity to hold the gasket in a leakproof manner over its entire width.

16 Claims, 26 Drawing Figures

MEMBRANE SUPPORT-PLATES FOR FLUID SEPARATING APPARATUS AND APPARATUS USING SUCH SUPPORT-PLATES

The present invention relates to a membrane support-plate for fluid separating apparatus and apparatus using said support-plates.

Apparatuses and support-plates of this type are known, especially from German Patent Application No. 2,209,116, in which the membrane support-plates, which are generally rectangular, possess, at each end, an elongated orifice through which the fluid to be treated passes, and, on each face, a cell which preferably contains a packing on which rests a membrane which covers the edges of the said cell; the edges of the support plates are provided with at least one pipeline for discharging the fluid, called the permeate, which has passed through the membranes.

In such apparatuses, the fluid to be treated flows under pressure in contact with the membranes and the latter are held in a leakproof manner on the longitudinal edges of each cell by gaskets, after clamping the support-plates and the gaskets between the two endplates. However, since the membranes cannot be held transversely in a leakproof manner by the gaskets between the cell and the elongated orifice, it has been proposed to glue them at these places.

However, it appeared advantageous, in order to use these plates, to hold the membrane transversely in a leakproof manner between the edge of each cell and the elongated orifice by means of a reliable mechanical device which was easy to assemble and dismantle.

According to the present invention we provide a membrane support plate for fluid separation apparatus, said support plate comprising a generally rectangular support plate having at least one orifice near one of its ends for the passage of fluid to be treated, at least one cell on at least one of the faces of the plates, a membrane covering said at least one cell, means communicating said cell with the exterior for discharging permeate which passes through said membrane, at least one cavity on said at least one face having a membrane thereon adjacent each transverse edge of a cell and a detachable device positioned in each cavity said device holding a membrane over its entire width in said cavity.

With such a construction it is possible to dispense with any gluing of membranes to the support-plates.

The present invention also relates to an apparatus equipped with one or more support-plates as defined above, alternating with gaskets between two endplates.

In order that the present invention will be better understood, the following description is given, merely by way of example, reference being made to the accompanying drawings, in which.

Figure 1:
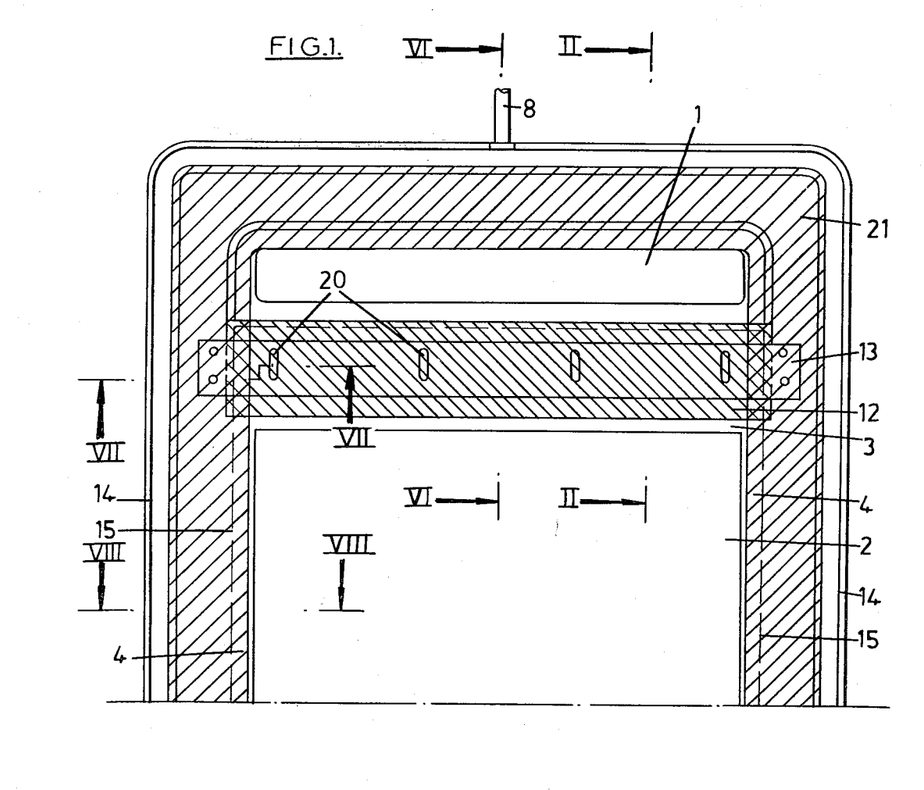
FIG. 1 is a partial front elevation of one end of one embodiment of support-plate according to the present invention.
Figure 2:
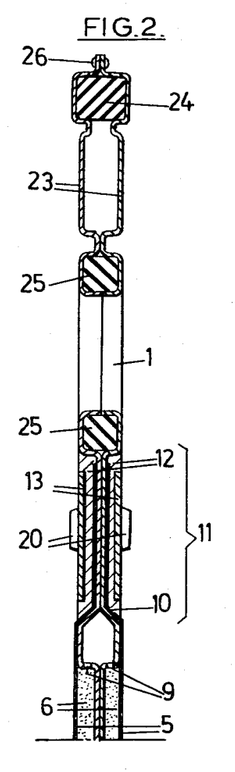
FIG. 2 is a cross-section taken along the line II—II of FIG. 1.

An embodiment of a membrane support-plate with a detachable device for fixing the membrane in a leakproof manner is partially shown in FIGS. 1 and 2. Only one end of a support-plate has been shown in these views, since a support-plate is generally rectangular and both ends of the plate can be identical. In the embodiment described below, the support-plate has one membrane on each of its faces and both its ends are identical.

A support-plate such as that defined above is substantially symmetrical relative to its longitudinal axis which passes through the cross-sectional line VI—VI. On its periphery, the support-plate has supporting and positioning means (not shown) corresponding to guide bars; an apparatus preferably results from the juxtaposition of support-plates in the vertical position along horizontal bars between two end-plates. This support-plate has, at each end, an elongated orifice 1 through which passes the fluid to be treated, and, on each of its faces, between the elongated orifices 1 of each end, a cell 2 which is covered, as are its transverse and lateral edges 3 and 4, by a membrane 5. Each cell 2 can be filled with a packing 6 comprising, for example, a porous material, such as a non-woven fabric made of polyethylene glycol terephthalate or paper impregnated with phenol/formaldehyde resin. Optionally, the cell may not have any packing and its base can have a corrugated profile or a profile in the form of a lattice, it being possible for the membrane to rest directly on this profile, especially if the membrane is screen-reinforced. Each cell 2 communicates with at least one pipeline 8 for discharging the fluid (called the permeate) which has passed through the membranes 5, the said cells having, on their walls, holes 9 for allowing the permeate to pass. When the support-plates according to the present invention have to be positioned vertically when they are functioning in an apparatus, the pipelines 8 are advantageously positioned at the lower part of each plate.

Figure 3:
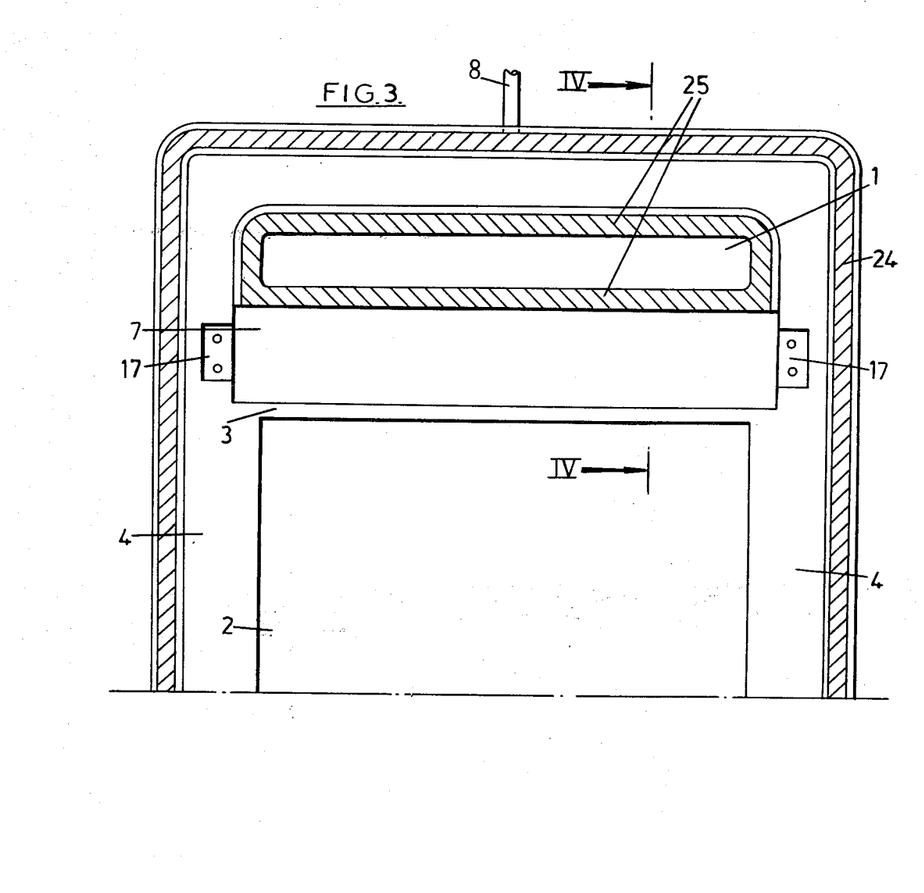
FIG. 3 is a partial front elevation of one end of the support-plate of FIG. 1 without the detachable device for fixing the membrane.
Figure 4:
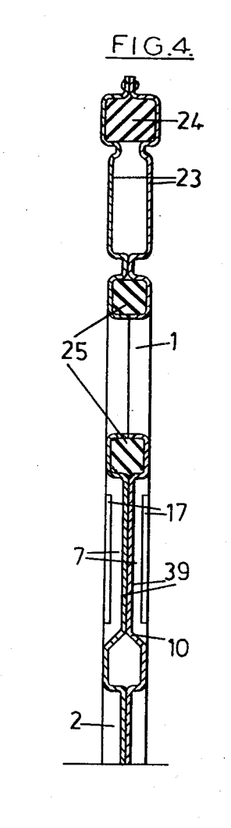
FIG. 4 is a view in cross-section taken along the line IV—IV of the support-plate of FIG. 3.

According to the invention, between each elongated orifice 1 and each transverse edge 3 of the cell, the support-plate has, on each face, a cavity 7, the length of which is a little greater than the width of the membrane 5. At each support-plate end, the two cavities 7 are advantageously back to back, as represented in FIGS. 3 and 4. In the embodiment described, each cavity 7 advantageously has a cross-section in the form of a trapezium, the height of which corresponds to the depth of the cavity and the small base of which corresponds to the bottom 39 of the cavity. The wall 10, on the cell 2 side, on each cavity 7 is thus preferably positioned obliquely relative to a plane parallel to the faces of the plate, whilst the opposite wall is substantially perpendicular to this plane.

Figure 5:
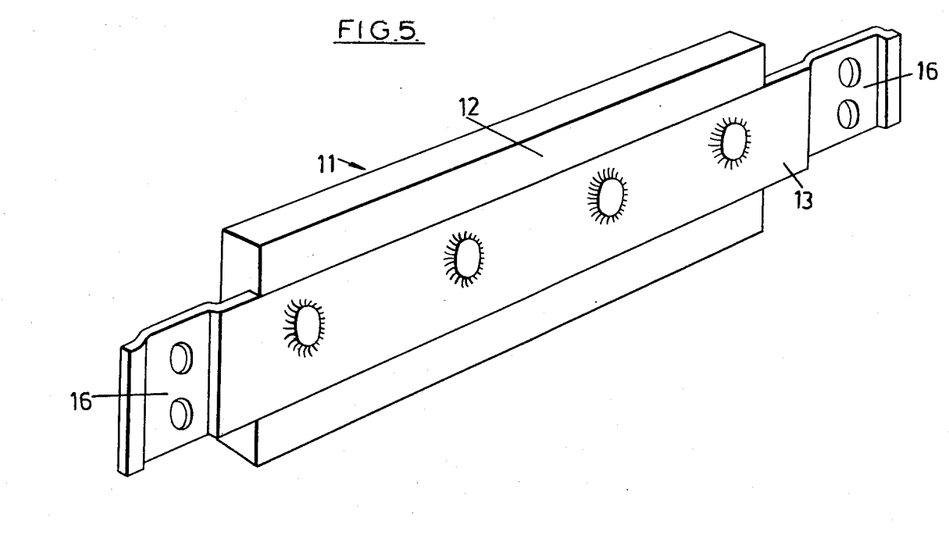
FIG. 5 is a view in perspective of one embodiment of the detachable device.
Figure 7:
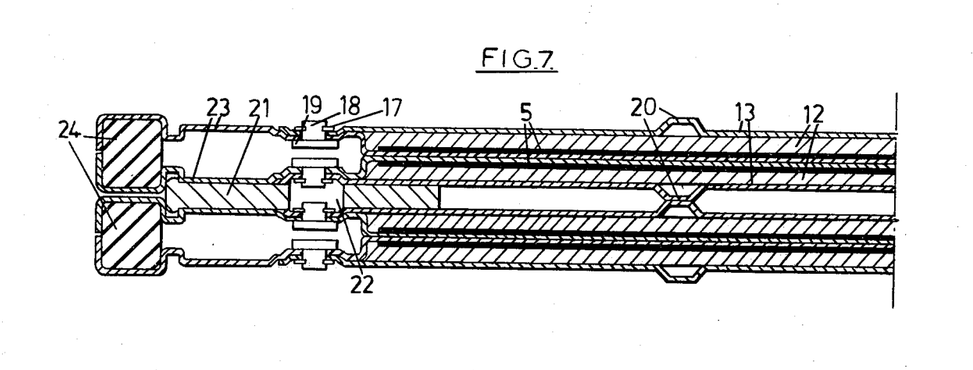
FIG. 7 is a cross-section taken along the line VII—VII of FIG. 1, with two support-plates separated by a gasket.
Figure 8:
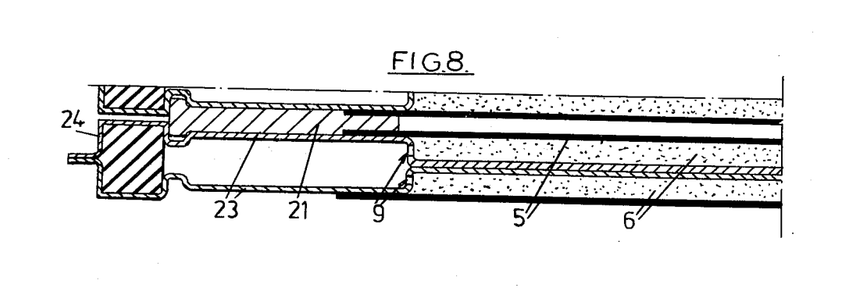
FIG. 8 is a cross-section taken along the lines VIII—VIII of FIG. 1.

Inside each cavity 7, a membrane support-plate comprises a detachable device 11, an embodiment of which is represented in FIG. 5. This detachable device 11 which fixes the membrane in the cavity, fills the cavity 7 practically completely and, once in place, advantageously has its face which is in contact with the fluid to be treated in the same plane as that of the membrane on the cell (see FIG. 2). This detachable device 11 comprises, for example, a gasket 12 and a small bar 13, the faces of the gasket which are opposite the cavity 7 following the shape of the cavity closely, while the small bar 13 is advantageously embedded in the face of the gasket 12 in contact with the fluid to be treated, so that the gasket face and the face of the small bar 13 in contact with the same liquid to be treated are practically in one and the same plane. The small bar 13 is held by means situated between the lateral edges 14 of the plate and the lateral edges 15 of the membrane 5. The small bar 13 is, in this embodiment, longer than the gasket 12 and its two ends 16 can rest on a flat part 17 provided on the plate. One method of holding the small bar 13 on the plate is represented in FIG. 7, these means consisting, in this case, of a part 17 embedded in grooves 18 provided on a part 19 which is itself advantageously in leak-proof contact with the plate.

On each face of the support-plate and at each of its ends, each membrane 5 is thus held in a leakproof manner over its entire width between the cell 2 and each elongated orifice 1 by means of the small bar 13 which presses the gasket 12 against the membrane 5 at the bottom and against the wall 10 of the cavity 7 concerned. So that the figures shall be better understood, the membranes have been represented by thick lines in FIGS. 2, 6, 7, 8, 9, 10, 11 and 13, whilst in FIGS. 1 and 12 the membranes have been represented by broken lines.

EAch small bar 13 described above advantageously has, on its face in contact with the fluid to be treated, at least one resting stop 20 which, in an assembly of the support plates into an apparatus, is in contact with an adjacent plate, which may be identical or different, or with an end-plate. These resting stops 20 make it possible to maintain a substantially uniform pressure over the entire length of the small bar 13, due to better distribution of the forces when the apparatus is clamped together and serve to ensure leakproofness and rigorous fixing of the membrane 5.

The gasket 12 of the detachable device can be made of moulded silicon elastomer, whilst the small bar 13 can be made of metal, and especially steel, stainless steel, titanium or steel which has been surface-treated, for example by enamelling.

Figure 6:
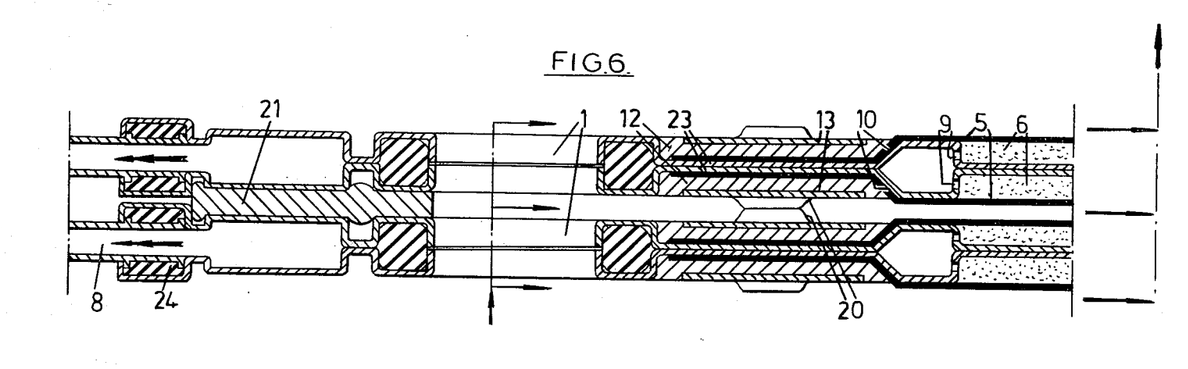
FIG. 6 is a cross-section taken along the line VI—VI of FIG. 1 (and FIG. 12) showing the relative positions of two support-plates separated by a frame-gasket.

FIGS. 6 and 7 show a stack of two support-plates identical to those described above. A gasket 21, which can optionally possess an opening 22 opposite the means for clamping the small bar 13, as represented in FIG. 7, is positioned between these two plates. In FIG. 1, the frame-gasket 21 is represented in plan view, positioned on a support-plate, this gasket 21 having been shown by a fine line and hatching sloping upwards from left to right, whilst the gasket 12 of the detachable device 11 has also been represented by hatching, but this time sloping upwards from right to left. The frame-gasket 21 covers the lateral edges 15 of the membrane 5, as can also be seen in FIG. 8.

Figure 10:
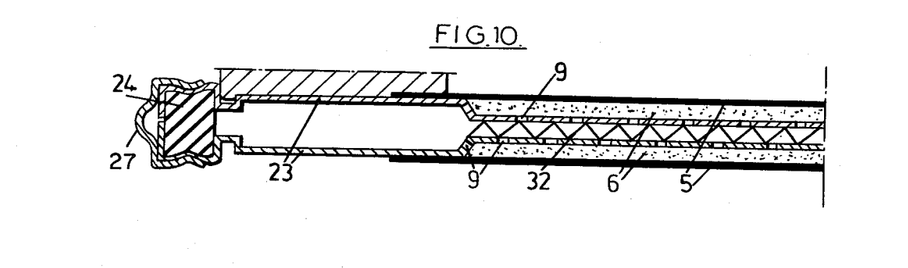
Figure 11:
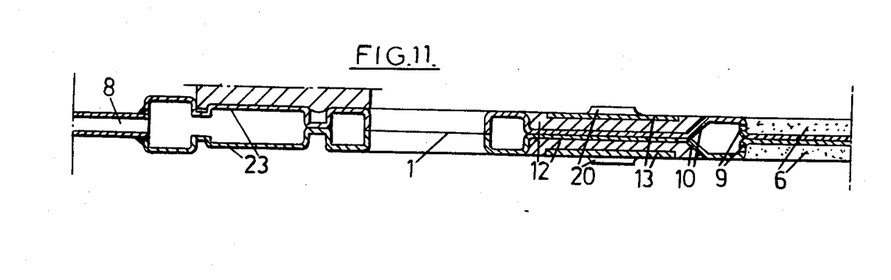

Each support-plate, without the detachable device 11, can of course be made of a single part, but in every case represented by the Figures the support-plates are formed by joining two parts. A support-plate such as that represented in cross-section in FIG. 4 thus comprises, in this case, two identical stamped plate elements 23. These two elements can be made of metal such as steel, stainless steel, titanium and the like, or of metal which has been surfacetreated, for example by enamelling. It is necessary to have leakproofness between the two elementary plate elements 23 over their entire periphery, and this is achieved by means of a gasket 24, the positioning of which, between the two plate elements 23 seen in plan view, is shown diagrammatically by the peripheral hatching of FIG. 3. An opening is provided in this gasket 24 to allow each pipeline 8 for discharging the permeate to pass through, as represented in FIG. 6. It is also necessary to have rigorous leakproofness around each elongated orifice 1, and this is achieved by means of a gasket 25 positioned between the two plate elements 23, as represented in FIG. 4, and the positioning of which, in plan view, is represented in FIG. 3 by the hatching surrounding the orifice 1. In order to hold the two plate elements 23 against one another, it is possible, for example, either to use rivets 26 on their periphery, as represented in FIGS. 2 and 4, or to employ clip-type clamping devices 27, such as that represented in FIG. 10. If, for example, plate elements 23 which are enamelled after assembly are used, it is possible, if desired, to dispense with the gaskets 24 and 25 inside the plate, and likewise with the means for holding the support-plates such as the rivets 26 or devices 27. In order to do this, the first step is to weld each pipeline 8 for discharging the permeate to the two plate elements 23 which have been brought close to one another, and then the resulting support-plate is enamelled. The layer of enamel makes it possible to fill up, in a leakproof manner, the interstices which made the gaskets 24 and 25 necessary at the periphery of the plate and around the elongated orifices 1. An enamelled support-plate without internal gaskets 24 and 25 is represented in FIG. 11.

FIGS. 16 to 25 represent a variant of the detachable device for the leakproof fixing of membranes to one of the ends of a support-plate which has a membrane on each face. In this embodiment, the detachable device 11 also comprises a gasket 12 and a small bar 13, but this detachable device is held in the cavity 7 by means which pass through the said cavity 7 and the gasket 12. These means for holding the detachable device (see FIG. 17) comprise, for example, a screw 34 with a circular head surrounded by a cylindrical gasket 35, the screw 34 being first tightened by means of the cylindrical nut 36 situated between the two plate elements 23, itself surrounded by a gasket 37, and then by means of a nut 38 also surrounded by a cylindrical gasket 35. In the embodiment represented, the cylindrical gaskets 35 of a plate are in contact with the cylindrical gaskets of the identical adjacent support-plate (see FIG. 20). However, it is possible for the means for holding the device for fixing the membranes not to be in contact from one plate to the other and the cylindrical gaskets 35 are then replaced by flat gaskets (not represented) placed under the head of the screw 34 and under the cylindrical nut 38. It is advantageous, as in the detachable device described above in FIGS. 1 to 8, for the base of the gasket 12 and of the small bar 13 in contact with the fluid to be treated to be in one and the same plane, corresponding to the plane of the membrane covering the cell.

Another variant (not shown) of the detachable device 11 and of the cavity 7 of the support-plate represented in FIGS. 16 to 25, consists in having a cavity 7 and a gasket 12 surrounding the elongated orifice 1.

Although the detachable device 11 has been described hitherto as comprising two separate elements (the gasket 12 and the small bar 13), these two elements can also be firmly fixed to one another and can form a single part. It is possible, for example, to deposit, by immersion or spraying, a product which is integral with the small bar 13; this product, for example made of silicone elastomer, epoxy resin or cellular polyvinyl chloride, acts as the gasket 12, whilst the small bar, which is for example made of metal, ensures the rigidity of the detachable device.

Figure 26:
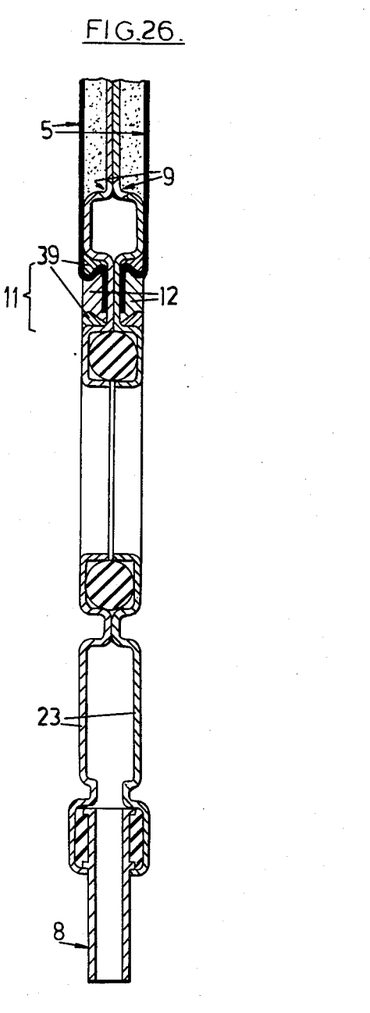
FIG. 26 is a cross-section of a variant of a detachable device, at one end of a support-plate.

It is also possible, by way of a variant, to have a detachable device which does not possess auxiliary holding means such as, for example, screws. An embodiment of a detachable device of this type is represented in FIG. 26 on a support-plate which possesses a membrane on each of its faces. Each detachable device 11 is held in place in the corresponding cavity 7 of the support-plate by its elasticity. In this embodiment, each cavity 7 of the support-plate advantageously has a trapezoidal cross-section with a dovetail shape and each cavity is filled by a gasket 12 which presses the membrane 5 into this cavity. When the support-plate consists of two metal plate elements 23 produced by stamping, the "dovetail" shape of the cavity 7 can be produced, for example, by gluing separate additional parts 39 made of rigid plastic or of metal to the edges of the cavity 7. The length of the cavity 7 filled by the gasket 12 is substantially equal to the width of the membrane covering the cell. The face of the gasket 12 in contact with the fluid to be treated is advantageously in the same plane as that of the membrane 5 on the cell. The gasket 12 can be made of rubber or of silicone elastomer. It can optionally comprise an inner flexible strip and have a resting stop on its outer face in contact with the fluid to be treated.

Numerous variants of support-plate equipped with a detachable leakproof membrane-fixing device according to the present invention will be apparent to those skilled in the art.

It is, for example, possible to have support-plate comprising two plate elements 23, the walls of which at the bottom of the cell are not in contact. In this case it can be advantageous, as represented in FIG. 10, to make use of an auxiliary part 32, for example a grid, between the two plate elements 23, in order to achieve better rigidity of the combination. The holes 9 for discharging the permeate can be at the bottom of the cell in these plate elements.

It is also possible to provide support-plate comprising a membrane on each face, but having an elongated aperture 1 only at one of their ends. Each of these support-plates, however, also has four detachable devices 11 for fixing membranes in a leakproof manner, one at each cell and on each of its faces.

Figure 9:
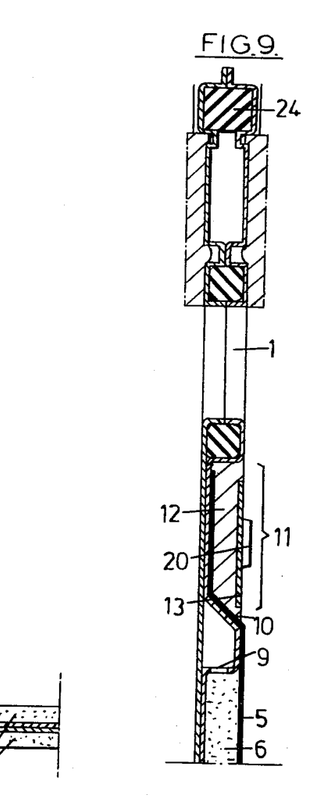
FIGS. 9, 10 and 11 are cross-sectional views of different embodiments of support-plates.

It is possible for support-plates according to the invention to have a membrane only on a single face, as represented in FIG. 9. Such support-plates then have only two membrane-fixing detachable devices 11.

Figure 12:
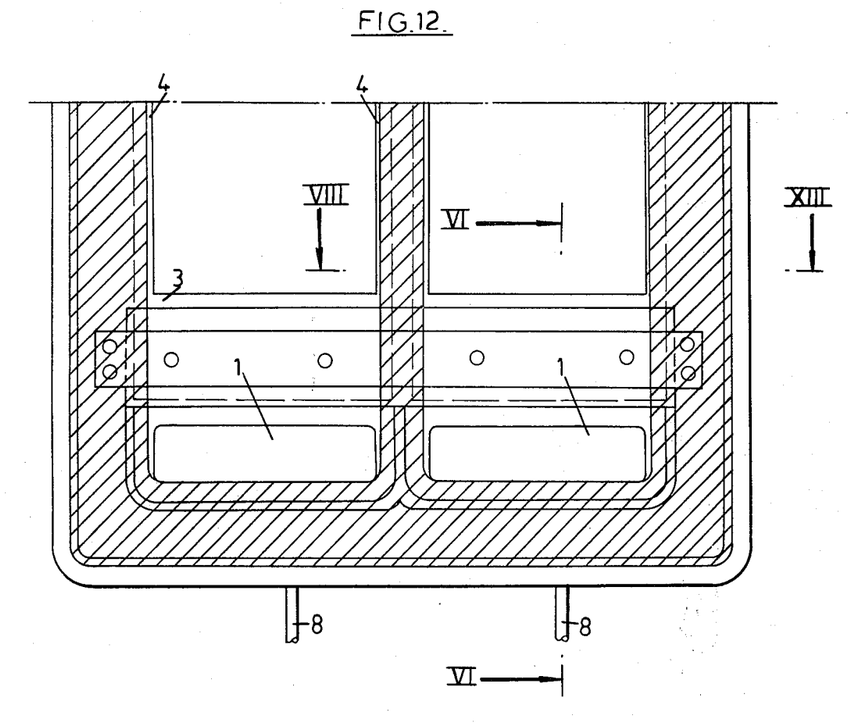
FIG. 12 is a partial front elevation of one end of another variant of support-plate according to the present invention.
Figure 13:
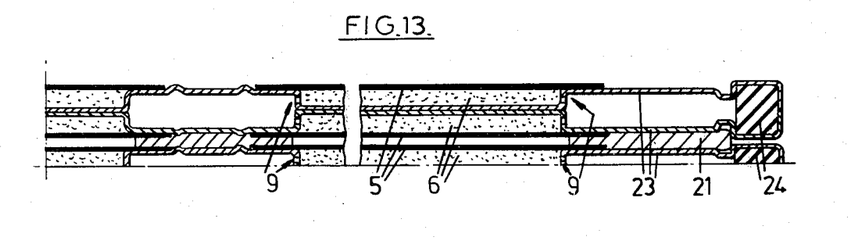
FIG. 13 is a cross-section taken along the line XIII—XIII of FIG. 12.
Figure 23:
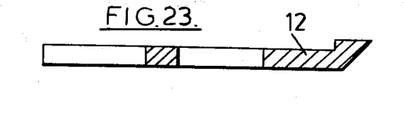
FIG. 23 is a cross-section taken along the line XXIII—XXIII of FIG. 22.
Figure 24:
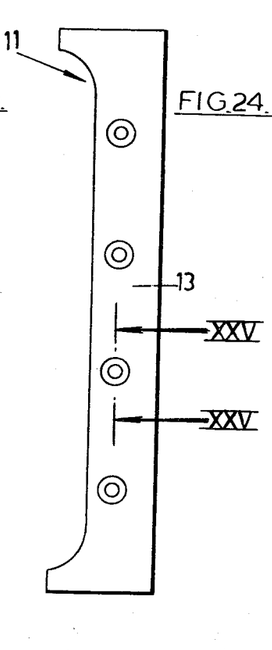
FIG. 24 is a front elevation of the small bar of the detachable device of the support-plate of FIG. 16.
Figure 25:
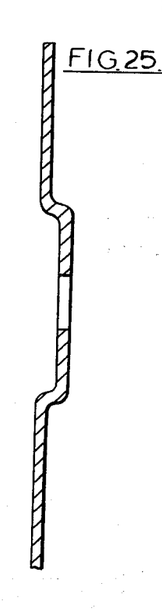
FIG. 25 is a cross-section taken along the line XXV—XXV of the small bar of FIG. 24.

Furthermore, support-plates can be produced with two or more cells on one or each of their faces and they can be equipped with an elongated orifice 1 at each cell end or only at one cell end. A support-plate with two cells on each of its faces is shown in FIGS. 12 and 23.

Each of the support-plates described hitherto advantageously has at least one pipeline for discharging the permeate, which opens on one edge of the support-plate concerned. This makes it possible to check individually the quality of the permeate from each plate and no longer to recover the permeate from a plate if a membrane is, for example, damaged. However, a plate according to the invention can optionally have means for discharging the permeate which do not issue directly from the plate concerned. These means can then open on each face of the support-plate in the zone covered by the frame-gasket 21 and not covered by the membrane. These means can, for example, be situated between the end of the plate and one of the elongated orifices through which the fluid to be treated passes. The permeate thus flows from one support-plate to the other, by means of an orifice provided in the gasket 21 at the places where the means for discharging the permeate open; these means can consist simply of holes provided on each face of the support-plate when the latter consists of two plate elements.

Figure 20:
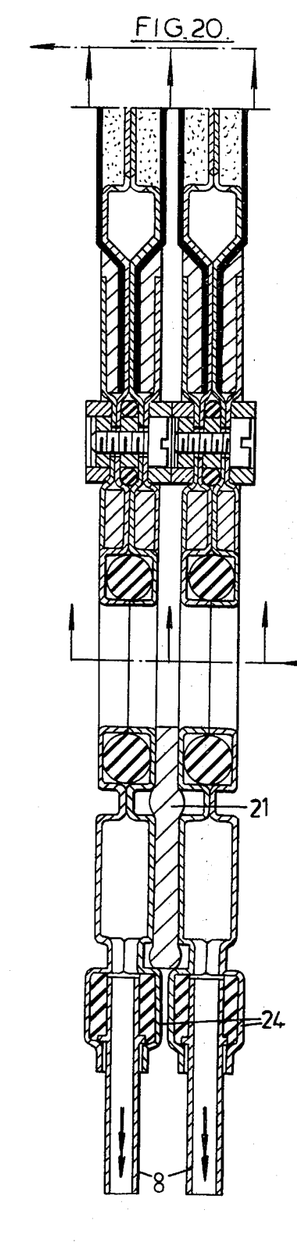
FIG. 20 is a cross-section taken along the line XX—XX of two support-plates such as that of FIG. 16.
Figure 21:
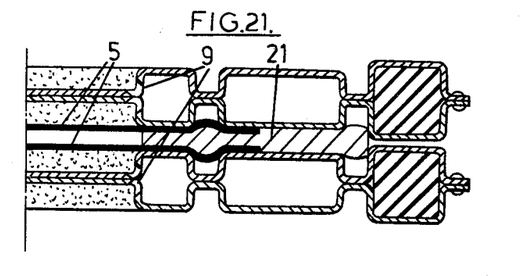
FIG. 21 is a cross-section taken along the line XXI—XXI of two support-plates such as that of FIG. 16.
Figure 22:
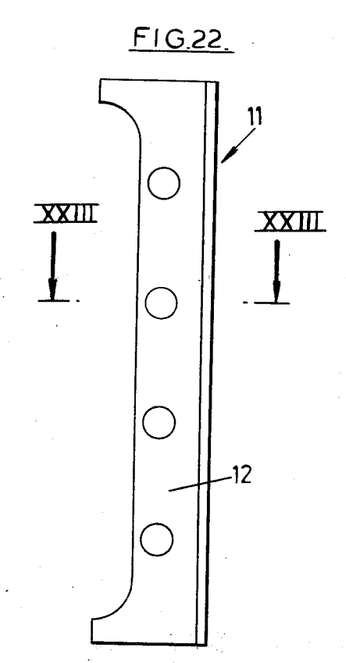
FIG. 22 is a front elevation of the gasket of the detachable device of the support-plate of FIG. 16.

An apparatus resulting from the juxtaposition of support-plates described above is represented in elevation in FIG. 14. It comprises a certain number of support-plates, each of which has, on each face, a cell covered by a membrane and an elongated orifice at each end, the said support-plates alternating with gaskets 21. These support-plates and gaskets are arranged between two end-plates 28, one of which has at least one feed pipeline 29 for the fluid to be treated and the other of which has at least one pipeline 30 for discharging the treated fluid. The support-plates and the gaskets are clamped between the two end-plates 28 by means of threaded rods 31. The membrane support-plates, which are positioned vertically, are supported, for example, by guide bars (not shown) and the permeate is discharged in each case at the lower part of each support-plate. FIGS. 6 and 20 represent the lower end of two support-plates of the apparatus of FIG. 14, separated by a gasket 21. The fluid to be treated flows in parallel between each membrane support-plate, for example following the direction of the arrows which have only one arrowhead. The fluid to be treated thus passes through the elongated orifices 1 at each end of the support-plates, whilst the permeate, after having passed through the membrane 5, the porous support 6 and the holes 9 on the walls of the cell 2 and having flowed inside the plate, is discharged through the pipelines 8 as shown by the arrows with two arrowheads.

Figure 14:
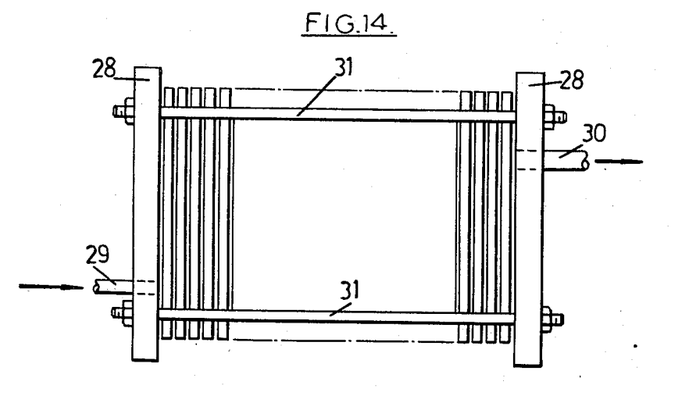
FIG. 14 is a side elevation of an apparatus according to the present invention.
Figure 15:
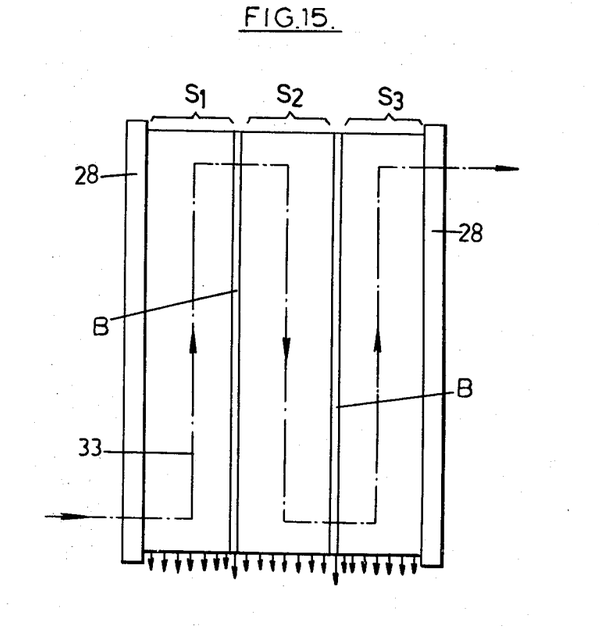
FIG. 15 is a diagrammatic view of one way in which fluids can flow inside an apparatus according to the invention.
Figure 16:
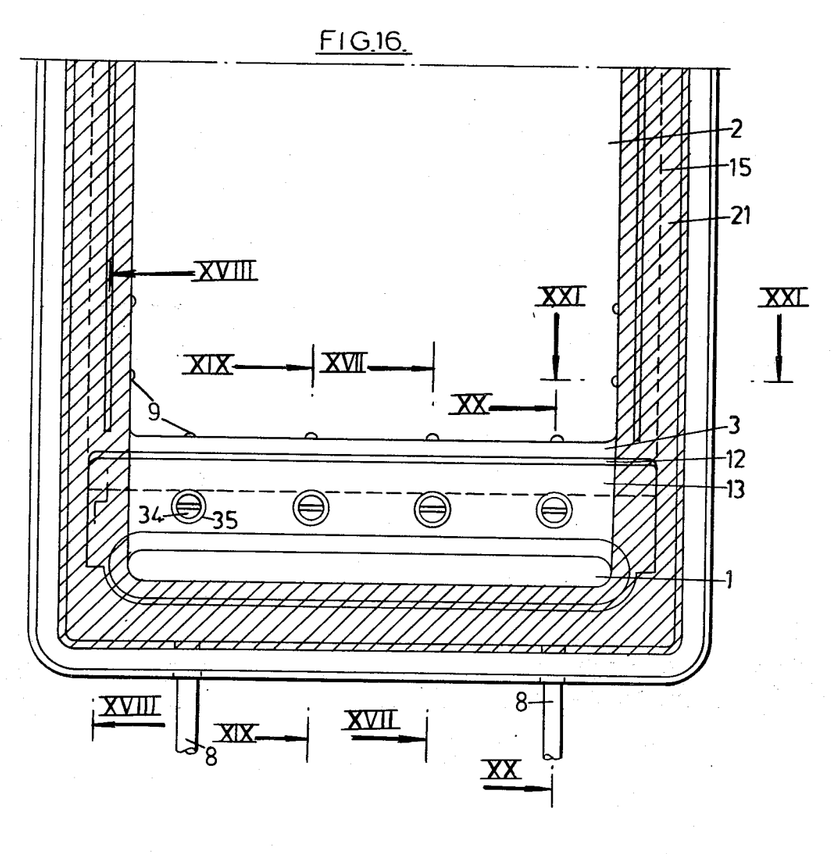
FIG. 16 is a partial front elevation of one end of a different embodiment of an end of a support-plate.
Figure 17:
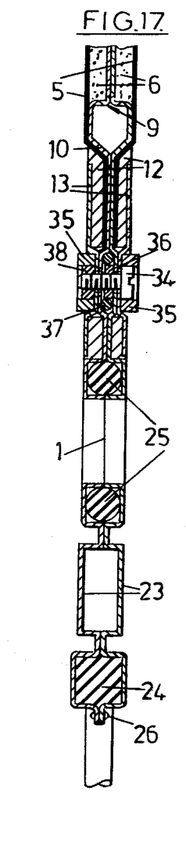
FIG. 17 is a cross-section taken along the line XVII—XVII of FIG. 16.
Figure 18:
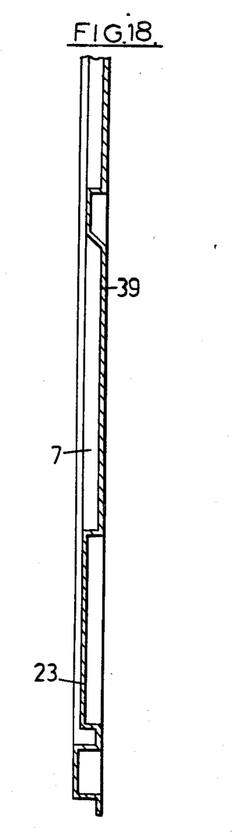
FIG. 18 is a cross-section taken along the line XVIII—XVIII of one of the elementary plates of the support-plate of FIG. 16.
Figure 19:
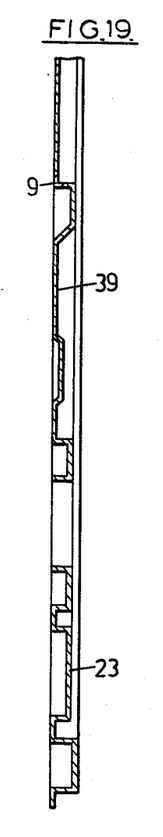
FIG. 19 is a cross-section taken along the line XIX—XIX of one of the elementary plates of the support-plate of FIG. 16.

FIG. 15 shows diagrammatically an advantageous embodiment of an apparatus according to the invention, the outer appearance of which is that of the apparatus of FIG. 14 which has already been described. Between its two end-plates 28 this apparatus comprises three sub-combinations $S_1$, $S_2$ and $S_3$, each comprising a certain number of support-plates according to the invention having at least one membrane on each of their faces and at least one elongated orifice at each of their ends. Between each sub-combination there is provided a support-plate according to the invention, having at least one membrane on each face, but having an elongated orifice only at one end. This support-plate is denoted by the letter B in FIG. 15. Thus the plate B, situated at the left, has an elongated opening 1 located at the top of the apparatus, whilst the plate B, situated at the right, has an opening located at the foot of the apparatus. The line 33 with arrowheads shows diagrammatically the flow in parallel of the liquid to be treated between each support-plate of a sub-combination, whilst the small arrows symbolise the pipelines 8 for the individual discharge of the permeate from each plate.

An apparatus according to the invention can also comprise only support plates, each of which has an elongated opening 1 only at one of its ends, the said support-plates then being arranged with their opening alternately at the top and then at the bottom (in the case of support-plates in a vertical position), the fluid to be treated thus flowing through the apparatus in series from one support-plate to the other. This arrangement is called head-to-tail.

When an apparatus comprises support-plates which do not provide for the possibility of individual discharge of the permeate from each support-plate, it is necessary for at least one of the end-plates to have a permeate discharge pipeline.

The advantages of the separating apparatuses equipped with support-plates according to the invention are many. The detachable leakproof membrane-fixing device is compact and easy to assemble, dismantle and clean. It is very reliable and does not present the risk of moving or of changing its position when the apparatus is being used, which greatly reduces the risks of leaks. Moreover, this detachable membrane-fixing device is particularly well suited to the use of stamped-out metal plate elements. This makes it possible considerably to widen the field of use of these apparatuses, especially because of their resistance to deterioration when exposed to solvents or to corrosive liquids. These apparatuses also have a better mechanical strength and a better heat-resistance. The stamped-out plate elements can be of very large dimensions without running the risk of buckling or deformation.

An apparatus equipped with support-plates according to the invention can be used in ultrafiltration, hyperfiltration, reverse osmosis or gas permeation in the chemical, pharmaceutical, paper-making, foodstuff and dyestuffs industry and the like. It is, for example, particularly well suited in the ultrafiltration of milk, which makes it possible to concentrate milk while allowing it to retain the bulk of its proteins but removing from it, in the ultrafiltration, water, salts and sugars such as lactose, when the membrane used has a suitable cut-off zone.

We claim:
1. A membrane support plate for fluid separation apparatus, said support plate comprising, in combination:
   a. two elementary plates of generally rectangular configuration of stamped sheet metal stock and substantially constant wall thickness, said elementary plates having opposite ends and faces, said elementary plates being tied together;
   b. at least one elongated orifice near one of the ends of each plate, the orifices of one plate being in register with the orifices of the other plate, and serving for the passage of fluid to be treated;
   c. at least one cell on the outer face of at least one of said elementary plates, said cell having two transverse edges;
   d. a membrane covering said at least one cell;
   e. means communicating said cell with the exterior for discharging permeate which is passed through said membrane;
   f. at least one elongated cavity on said at least one face adjacent each transverse edge of the cell extending transversely across said plate and situated between the transverse edge of the cell and the nearest elongated orifice;
   g. a bottom surface to said cavity having said membrane thereon; and
   h. a detachable device positioned in said cavity, said detachable device holding said membrane over its entire width against the bottom surface of said cavity.

2. A support-plate as claimed in claim 1, wherein there is at least one cell on each of said faces and the cavities of each face have their faces back to back.

3. A support-plate as claimed in claim 1, wherein the wall of the cavity, situated near the transverse edge of the cell and in contact with the bottom of the said cavity, has a length at least equal to the width of the membrane.

4. A support-plate as claimed in claim 1, wherein each cavity, between the transverse edge of the cell and the elongated orifice, has a cross-section in the shape of a trapezium, the height of which corresponds to the depth of the respective cavity.

5. A support-plate as claimed in claim 1, wherein each said detachable device, after being fixed to the said plate, has a face contactable by the fluid to be treated, this face being substantially in the same plane as that of the membrane on the cell.

6. A support-plate as claimed in claim 5, wherein each said detachable device comprises at least one resting stop on the face contactable by the fluid to be treated.

7. A support-plate as claimed in claim 1, wherein each said detachable device comprises a gasket filling its respective cavity.

8. A support-plate as claimed in claim 1, wherein each said detachable device comprises a gasket and a small bar.

9. A support-plate as claimed in claim 8, wherein the cavity has a cross-section in the form of a rectangular trapezium, the wall of which, on the cell side is oblique to said faces of the plate.

10. A support-plate as claimed in claim 8, wherein the gasket and the small bar are held by means which pass through the bottom of the cavity.

11. A support-plate as claimed in claim 1, and further comprising a gasket at its periphery and a gasket around each orifice, these gaskets being situated between the two elements.

12. A support-plate as claimed in claim 1, and further comprising enamelling ensuring leakproofness at the periphery and at each orifice.

13. Apparatus for effecting separation, by selective permeation, said apparatus comprising two end plates, at least one feed pipe for the fluid to be treated passing through one of the end plates, at least one pipe line for discharging the treated fluid passing through the other end plate and at least one support plate positioned between said end plates, said at least one support plate comprising, in combination:
 a. two elementary plates of generally rectangular configuration of stamped sheet metal stock and substantially constant wall thickness, said elementary plates having opposite ends and faces, said elementary plates being tied together;
 b. at least one elongated orifice near one of the ends of each plate, the orifices of one plate being in register with the orifices of the other plate, and serving for the passage of fluid to be treated;
 c. at least one cell on the outer face of at least one of said elementary plates, said cell having two transverse edges;
 d. a membrane covering said at least one cell;
 e. means communicating said cell with the exterior for discharging permeate which is passed through said membrane;
 f. at least one elongated cavity on said at least one face adjacent each transverse edge of the cell extending transversely across said plate and situated between the transverse edge of the cell and the nearest elongated orifice;
 g. a bottom surface to said cavity having said membrane thereon; and
 h. a detachable device positioned in each cavity, said detachable device holding said membrane over its entire width against the bottom surface of said cavity.

14. Apparatus as claimed in claim 13, wherein it comprises a plurality of said support-plates each of which has at least one opening at only one end arranged head-to-tail and further comprising gaskets separating the support-plates.

15. Apparatus as claimed in claim 13, wherein it comprises a plurality of said support-plates each of which has at least one opening at each end and further comprising gasket separating the support-plates.

16. Apparatus as claimed in claim 13, comprising at least two sub-combinations, each consisting of a plurality of said support-plates each of which has at least one opening at each end, gaskets alternating with said support plates and further comprising a support-plate which has at least one opening only at one of its ends separating adjacent sub-combinations from one another the at least one opening of the latter plate ensuring that the fluid to be treated flows in series from one sub-combination to the next.

* * * * *